Oct. 20, 1936.  H. R. PRESCOTT ET AL  2,058,106

SYSTEM SENSITIVE TO VIBRATIONS

Filed Feb. 5, 1934

INVENTOR
Harold R. Prescott
Anthony P. Lipski
By Thos. E. Scofield
ATTORNEY

Patented Oct. 20, 1936

2,058,106

UNITED STATES PATENT OFFICE 2,058,106

SYSTEM SENSITIVE TO VIBRATIONS

Harold R. Prescott and Anthony P. Lipski, Ponca City, Okla., assignors to Continental Oil Company, Ponca City, Okla., a corporation of Delaware Application February 5, 1934, Serial No. 709,898

8 Claims. (Cl. 73—51)

Our invention relates to a system sensitive to vibration and more particularly to means whereby a mass system may be suspended to be susceptible to vibrations in a selected plane.

In making geological explorations employing seismic waves, means must be provided sensitive to vibration for receiving the waves. Our invention relates particularly to a system adapted to be used in connection with a device for recording vibrations and particularly seismic waves.

One object of our invention is to provide a system sensitive to vibration in one direction only.

Another object of our invention is to provide a system sensitive to vibration, the mass of which may be tuned to vibrate readily to a given frequency.

Other and further objects of our invention will appear from the following description.

In the accompanying drawing which forms part of the instant specification and are to be read in conjunction therewith and in which like reference numerals are used to indicate like parts in the various views.

Figure 1:
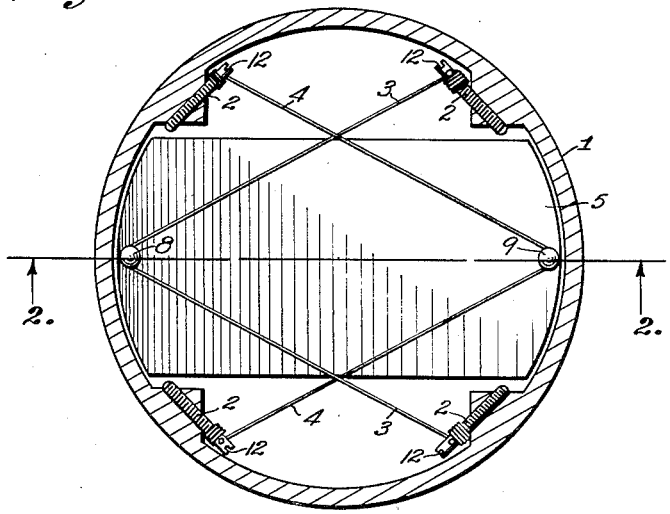
Figure 1 is a sectional plan view of a device embodying one mode of carrying out our invention.
Figure 2:
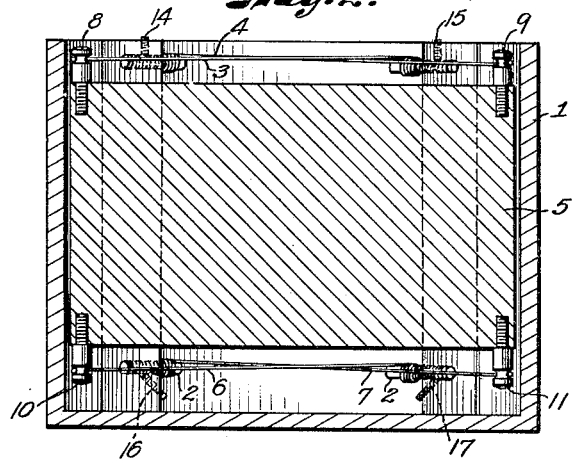
Figure 2 is a sectional view taken on a line 2—2 of Figure 1.

A frame 1 is provided at suitable points with screw pins 2 to which are secured the ends of wires 3 and 4. A mass 5 which may be of any suitable heavy material such as metal or the like, is suspended from the frame 1 by means of wires 3, 4, 6 and 7. It is to be understood that, when we say "wires" that we mean any suitable flexible elongated material such as steel ribbon or the like. Pins 8, 9, 10, and 11 are secured to the mass in any suitable manner or made integral therewith. The screw pins 2 are screwed into suitable places in the frame and lie substantially in the same horizontal plane. In the form of the invention shown in the drawing, wire 3 extends from a screw pin around pin 8 to a second screw pin as can readily be seen by reference to Figure 1. Wire 4 extends from a screw pin 2 around pin 9 to a second screw pin lying in the same side of the center line of the frame, as can readily be seen by reference to the drawing. Similarly, wires 6 and 7 are secured by screw pins 2 around pins 10 and 11. The wires 3, 4, 6, and 7 are adjusted to suitable tension by means of slots 12 in pins 2. Suitable set screws 14, 15, 16, and 17 are adapted to lock the pins 2 in any adjustable position. It is to be understood, of course, that any other suitable locking means such as a lock and nut or a taper pin may be used, if desired. The tension of the wires 3, 4, 6, and 7 is such that the mass 5 is rigidly supported against movement in the plane of the wires, that is in the horizontal plane. The friction of the wires around pins 8, 9, 10, and 11 is such that the mass is prevented from rotating much in the same manner as a bridge is held in a vertical position.

It is to be understood, of course, that wires 3 and 4 may be secured positively to pins 8 and 9 and wires 6 and 7 may be positively secured to pins 10 and 11 by any suitable securing means. It will be observed that the mass 5 may vibrate in a vertical direction, due to the elasticity of the wires while movement of the mass in a horizontal plane is substantially restricted. It will also be observed that the mass 5 will be considerably more yieldingly suspended for movement in a vertical direction as the wires 3, 4, 6, and 7 increase in length. If diaphragms were used, for example, for suspending the mass, the maximum effective vibrating length would be that from the center of the diaphragm to the frame: in other words, substantially a radius. It will appear that our construction will give the greatest flexibility in a vertical direction for a given size of frame, while also permitting accurate adjustment of the tension of the suspending means.

In use, a system of our invention, when exposed to vibrations, will give a relative movement between mass 5 and frame 1. The mass, due to its inertia, will tend to remain more or less stationary in space, while the frame will move relative to the mass. This differential movement may be made to operate a lever arm carrying a pencil. It may be made to operate an optical mirror so that the vibrations being received can be photographically recorded. We prefer, however, to secure to the frame in proximity to the mass a solenoid or solenoids connected in a circuit. The relative movement of the mass will change the inductance in the solenoid so that the voltage induced in the circuit will vary in phase with relative movement of the mass with respect to the frame. This change in inductance will result in changes of current which may be employed in a number of different ways. The changes in current thus produced may be employed to operate a mirror galvanometer and the fluctuations be recorded photographically. The changes in current may be made to operate a stylus adapted to trace a curve corresponding to the received vibrations upon a record. The advantage of using an electrical system is that the vibrations may be amplified as desired. Another method of using the relative movement of the mass to the frame is to support one plate of a condenser from the mass and another plate of a condenser from the frame. The variation of the spacing of the condenser plates will change the capacity of the condenser. The condenser is part of an electrical oscillating circuit such that the frequency of the oscillating circuit will change according to vibrations received by our system.

It will be appreciated that we have accomplished the objects of our invention. We have provided a system sensitive to vibration having greater sensitivity to vibrations in a selected direction, while being substantially insensitive to vibrations in other directions. We have provided a system sensitive to vibration which may be adjusted to be more sensitive to selected frequencies. Our system may be used in connection with an oscillating circuit to vary the inductances, the capacity and high resistance thereof. In using our system to vary the resistance of the oscillating circuit, a carbon button may be used, either directly in the circuit or in a shunt connected to the circuit. In this manner, the vibrations received by our system may be recorded.

It will be understood that certain features and subcombinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In a system sensitive to vibration, a frame, a mass having upper and lower faces, a pair of pins on each face lying along a line passing through the vertical axis of said mass, wires lying substantially in horizontal planes secured to said frame and said pins for flexibly suspending said mass for movement in a vertical direction only.

2. A system as in claim 1 wherein means are provided for adjusting the tension of said wires.

3. In a system sensitive to vibration, a frame adapted to be supported by an object the vibration of which is to be investigated, a mass of such inertia that it will remain substantially stationary upon vibratory movement of said frame relative thereto, a plurality of pairs of wires lying substantially in separated horizontal planes and secured to said mass at points removed from the axis thereof for suspending said mass from said frame for movement in the direction substantially perpendicular to the planes of said pairs of wires.

4. In a system sensitive to vibration, a frame adapted to be supported by an object the vibration of which is to be investigated, a mass of such inertia that it will remain substantially stationary upon vibratory movement of said frame relative thereto, a plurality of pairs of wires secured to the frame lying in horizontal planes and suspending the mass therewithin from points on said mass removed from the axis thereof, said wires restricting movement of said mass in a horizontal plane while permitting movement thereof in a vertical plane, and means for adjusting the tension on said wires.

5. In a system sensitive to vibration, a frame adapted to be supported by an object the vibration of which is to be investigated, a mass of such weight that it will remain substantially stationary in space upon vibratory movement of said frame relative thereto, wires secured to said frame and suspending the mass therewithin, said wires lying substantially in parallel planes and restricting movement of the mass in said planes while permitting movement thereof perpendicular thereto, said wires being secured to said mass at points of attachment removed from the axis thereof.

6. A system as in claim 5 wherein means are provided for adjusting the tension of said wires.

7. In a system sensitive to vibration, a frame adapted to be supported by an object the vibration of which is to be investigated, a mass of such weight that it will tend to remain stationary upon vibratory movement of said frame, wires secured to said frame and said mass at points of attachment removed from the axis thereof for suspending the same within said frame, the wires being on each side of a line drawn through the points of attachment to the mass and extending in opposite directions, whereby movement of the mass in a plane passing perpendicular through the securing points of the wires is restricted while the mass is flexibly supported for movement substantially perpendicular to said plane.

8. A system as in claim 7 wherein the length of the wires between respective points of attachment to the frame and the mass, is substantially longer than the distance from the point of intersection of the vertical axis of said mass and said plane, to points of attachment of the wires to said frame.

HAROLD R. PRESCOTT.
ANTHONY P. LIPSKI.